United States Patent [19]

Bohannon

[11] Patent Number: 4,845,748
[45] Date of Patent: Jul. 4, 1989

[54] METHOD OF ASSEMBLING A TELEPHONE KEYPAD

[75] Inventor: Harold L. Bohannon, Shreveport, La.

[73] Assignees: American Telephone and Telegraph Company, New York, N.Y.; AT&T Information Systems Inc., Morristown, N.J.

[21] Appl. No.: 140,969

[22] Filed: Jan. 7, 1988

Related U.S. Application Data

[63] Continuation of Ser. No. 924,967, Oct. 30, 1986, abandoned.

[51] Int. Cl.⁴ ............................................. H04M 1/23
[52] U.S. Cl. .................................. 379/368; 379/369; 379/428; 379/440
[58] Field of Search ................ 379/368, 369, 428, 440

[56] References Cited

U.S. PATENT DOCUMENTS

| | | | |
|---|---|---|---|
| 3,293,373 | 12/1966 | Lohs | 379/428 |
| 3,479,470 | 11/1969 | Ham, Jr. | 340/365 R |
| 3,657,487 | 4/1972 | Schwank et al. | 379/428 |
| 4,284,855 | 8/1981 | Adams et al. | |
| 4,291,202 | 9/1981 | Adams et al. | |
| 4,349,705 | 9/1982 | Kuhfus | 340/365 R |
| 4,394,545 | 7/1983 | Doyle et al. | 379/440 |
| 4,491,695 | 1/1985 | Haskins | 379/369 |

FOREIGN PATENT DOCUMENTS

| | | | |
|---|---|---|---|
| 0112103 | 10/1925 | Fed. Rep. of Germany | 379/369 |
| 0117759 | 7/1983 | Japan | 379/369 |

Primary Examiner—Gerald L. Brigance
Assistant Examiner—Richard Hjerpe
Attorney, Agent, or Firm—Harry L. Newman; Samuel R. Williamson

[57] ABSTRACT

The invention is directed to a telephone structure that eliminates the need for fasteners to assemble a keypad and secure the keypad in place in the telephone. This is accomplished by a telephone that comprises a hollow housing (100) having a face portion (120) that includes an array of holes (122) and a keypad assembly (400) that comprises a sandwich of a static shield (430), button member (410), and switch contact member (450). The keypad assembly is assembled on the underside of the housing by means of a locating member (300) which has upstanding collar portions (325) that register in the holes of the face portion and depending pins (328) that register in holes in the members of the keypad assembly. The keypad assembly is held in place by a base member (200) that is joined to the housing and supports a raised pedestal (210) that extends into close proximity with the underside of the face portion and presses the keypad assembly against the face portion (FIG. 1).

2 Claims, 2 Drawing Sheets

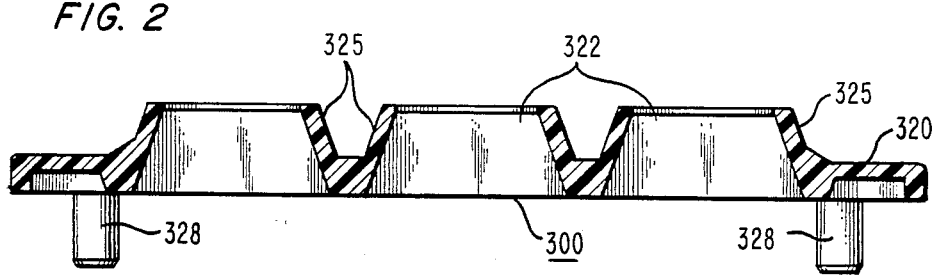
FIG. 2
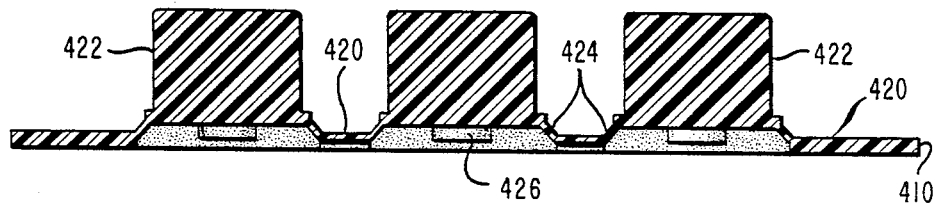
FIG. 3
FIG. 4
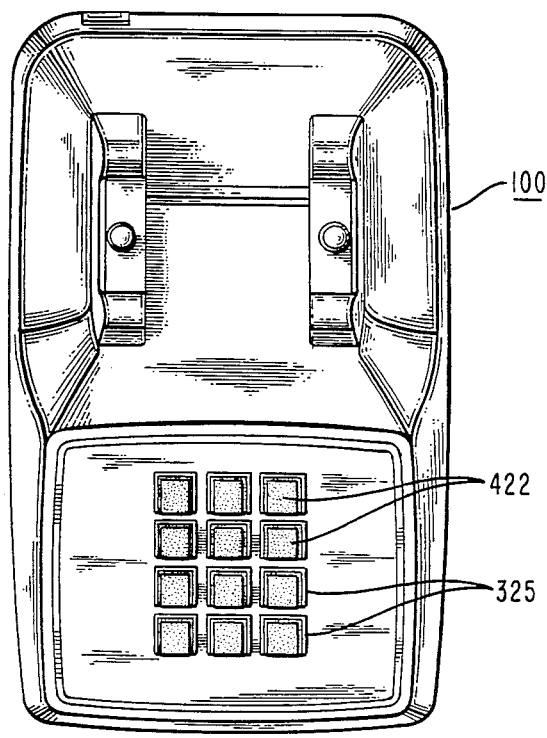

METHOD OF ASSEMBLING A TELEPHONE KEYPAD

This application is a continuation of application Ser. No. 924,967, filed Oct. 30, 1986, now abandoned.

TECHNICAL FIELD

This invention relates to telephones and is particularly concerned with a methon that facilitates assembly of a telephone.

BACKGROUND OF THE INVENTION

In the very competitive realm of telephones, it has become increasingly important to reduce and simplify the steps involved in the manufacture of a telephone. Each step eliminated or simplified reduces the labor content and/or facilitates automated assembly of the telephone.

Heretofore, the keypad used to generate the telephone calling signals has typically been assembled as a discrete component by the use of fastening elements and then it has been secured in place in the telephone by the use of fastening elements. These fastening elements must be individually handled and therefore introduced either a relatively large expenditure of labor or require a relatively large expenditure of capital to provide automated assembly.

SUMMARY OF THE INVENTION

The problem of having to use fastening elements to secure a keypad in place in a telephone is solved in accordance with the present invention by a telephone that comprises a hollow housing including a face portion having a bottom surface, an array of holes extending through the face portion. A member joined to the housing supports an upwardly extending pedestal having a top surface that extends adjacent to the bottom surface of the face portion. A keypad is positioned intermediate the top surface of the pedestal and the bottom surface of the face portion, the keypad having an array of buttons that is accommodated by and extends through the array of holes in the face portion. The keypad is held in place by the top surface of the pedestal pressing the keypad against the bottom surface of the face portion.

The problem of having to use fastening elements to assemble the members of a keypad is solved in accordance with the present invention by one or more locating elements associated with either the housing or the pedestal. In one embodiment of the invention, the locating elements are part of a locating member associated with the face portion of the housing, the locating elements including a multiple of pins extending downwardly from the locating members. The pins are accommodated by conforming holes in the members that comprise the keypad and these members are assembled on the locating member. The keypad members are held together by the top surface of the pedestal pressing the assembled members against the bottom surface of the face portion.

BRIEF DESCRIPTION OF THE DRAWING

FIG. 2 is an enlarged sectional view taken along line 2—2 of FIG. 1;

FIG. 3 is an enlarged sectional view taken along line 3—3 of FIG. 1; and

FIG. 4 is a top view of the assembled telephone.

DETAILED DESCRIPTION

Figure 1:
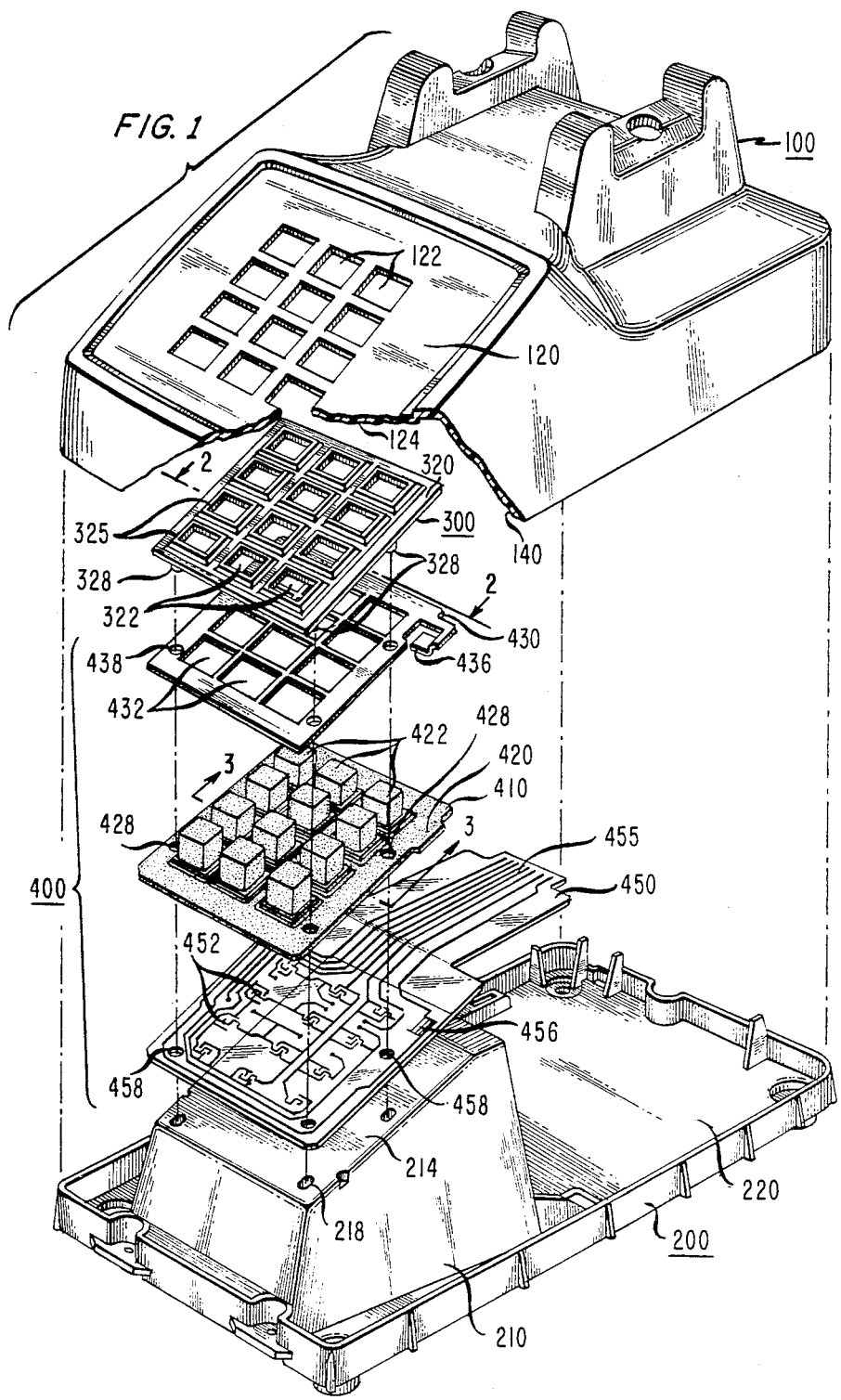
FIG. 1 is an exploded perspective view of an embodiment of a telephone in accordance with the invention.

Referring to the drawing, and FIG. 1 in particular, a telephone in accordance with the present invention includes a hollow housing 100. The housing 100 includes a face portion 120 that has an array of holes 122 that extend through it. While in the embodiment shown the holes 122 are arranged in a matrix of rows and columns, as will be clear from the subsequent description, the size and arrangement of the holes is selected to correspond to the buttons on a keypad 400 of the telephone. In addition, while in the embodiment shown the face portion 120 is planar and has a level bottom surface 124, the face portion can be curved and the bottom surface can be ridged or have other irregularities in height and still perform its desired function.

The housing 100 has a bottom opening 140 that provides access to its interior including the bottom surface 124 of the face portion 120. In the embodiment shown the opening 140 is closed by a base member 200 that is joined (such as by fasteners not shown) to the housing 100, the combination of the housing and base member providing an enclosure for a desk telephone stand. However, the present invention may equally be embodied in a wall telephone stand including a keypad or in a handset including a keypad. In the case where the invention is embodied in a wall telephone stand, the orientation of the face portion 120 would be modified to facilitate dialing with the housing vertical. In the case where the invention is embodied in a handset, the housing 100 would serve as the face of the handset while the member 200 would serve as the back of the handset.

The base member 200 supports a pedestal 210 that extends upwardly from a bottom portion 220 thereof. The pedestal 210 is advantageously integral to the base member 200, but it can be a discrete member joined to the base member or it can be supported by another member that is joined to the housing 100. The pedestal 210 has a top surface 214 that advantageously conforms to the bottom surface 124 of the face portion 120 of the housing member 100. Thus, in the embodiment shown, the top surface 214 is planar and is inclined so that when the base member 200 is joined to the housing 100, the top surface extends parallel to the bottom surface 124 of the face portion 120. In addition, the pedestal 210 is of a height that when the base member 200 is joined to the housing 100, the top surface 214 lies adjacent to the bottom surface 124 but is spaced from the bottom surface a particular distance. While in the embodiment shown, the top surface 214 is level, it can be ridged or have irregularities in height and still perform its desired function. In addition, the top surface 214 has a multiple of holes 218 therein the purpose of which is subsequently explained.

Positioned intermediate to the bottom surface 124 of the face portion 120 and the top surface 214 of the pedestal 210 is a locating member 300 and a keypad 400. Referring also to FIG. 2, the locating member 300 includes a planar flange portion 320 surrounding an array of holes 322 that corresponds to the array of holes 122 in the face portion 120. The holes 322 are each circumscribed by an upwardly extending collar portion 325 having sloping side walls that converge toward one another in the bottom to top direction. The collar portions 325 are of a size and shape to be respectively accommodated by the holes 122 in the face portion 120 and to occupy the perimeter of these holes when the locating member 300 is positioned on the bottom surface 124 of the face portion. Thus the collar portions 325 serve to locate the locating member 300 with respect to the face portion 120, and the locating member in turn has a multiple of pins 328 that extend downwardly from the flange portion 320 and serve to locate the keypad 400 with respect to the locating member.

Referring to FIGS. 1 and 3, the keypad 400 comprises a static shield 430, a button member 410, and a switch contact member 450. The button member 410 is advantageously a unitary member molded from rubber or a similar resilient material. The button member 410 includes a planar flange portion 420 surrounding an array of button portions 422 that corresponds to and is accommodated by the collar portions 325 of the locating member 300. Furthermore, the button portions 422 are of a height that when the locating member 300, static shield 430, and button member 410 are assembled on the bottom surface 124 of the face portion 120 of the housing 100, the button portions extend through the above both the holes 122 of the face portion and the collar portions 325 of the locating member.

The button portions 422 are respectively joined to the flange portion 420 by thin web portions 424 that circumscribe the button portions. The web portions 424 permit each button portion 422 to move downwardly when a downward force is applied to its top surface. In addition, the bottom surface of each button portion 422 has a downwardly extending conductive protrusion 426 that is moved into engagement with the switch contact member 450 when the button portion is depressed. When the force is removed, the web portion 424 serves to return its associated button portion 422 to its normal position.

As seen most clearly in FIG. 1, the flange portion 420 of the button member 400 has a multiple of holes 428 that respectively conform to and accommodate the multiple of pins 328 of the locating member 300. The pins 328 cooperate with the holes 428 to essentially center the button portions 422 within the collar portions 325 of the locating member 300. This, combined with the sloping side walls of the collar portions 325 (FIG. 3) avoids interference with the movement of the button portions 422 when they are depressed or when the depressing force is removed.

The switch contact member 450 underlies and is properly located with respect to the button member 410 by a multiple of holes 458 that respectively conform to and accommodate the multiple of pins 328 of the locating member 300. The switch contact member 450 has an array of switch contact elements 452 on the top surface thereof that corresponds to the array of button portions 422 of the button member 410. In the embodiment shown, a pair of switch contact elements 452 is associated with each button portion 422 and the switch contact elements comprise spaced conductive paths on a flexible printed circuit. Each pair of switch contact elements 452 is bridged, that is, electrically connected together, when engaged by the conductive protrusion 426 on the underside of the associated button portion 422 as a result of the associated button portion being depressed. It is to be understood, however, that each button portion 422 could serve just as an actuator of a switch contact element and that each switch contact element could comprise a spring contact, that is deflected by the associated button portion into engagement with another spring contact or a fixed contact.

In the embodiment shown, the conductive paths to which the switch contact elements 452 are connected all extend onto a tail portion 455 of the flexible circuit. The tail portion 455 serves to electrically connect the conductive paths to another component of the telephone such as a multifrequency signal generator. Since this and other components of the telephone are not part of the present invention, they are not shown and are not described.

The static shield 430 is positioned on the button member 410 and serves to remove static electricity discharged from the finger of a person depressing one of the button portions 422. The static shield 430 comprises a thin electrically conductive member having an array of holes 432 that corresponds to the array of button portions 422 of the button member 410. The holes 432 are of a size to permit the button portions 422 and the web portions 424 to pass through the holes so that the static shield rests on the flange portion 420 of the button member 410. The static shield 430 also has a multiple of holes 438 that conform to and respectively accommodate the multiple of pins 328 of the locating member 300. The static shield 430 is thereby properly located with respect to the button member 420. Finally, the static shield 430 has a springlike contact portion 436 that is formed from a tab that extends to one side of the static shield and beyond the corresponding side of the button member 410. The contact portion 436 extends below the plane of the static shield 430 such that when the static shield, button member 410, and switch contact member 450 are assembled on the locating member 300, the contact portion engages a conductive pad 456 on the switch contact member. The conductive pad 456 is connected to ground by means not shown via a conductive path on the switch contact member 450.

In the embodiment shown, the components relative to this invention are advantageously assembled by inverting all of them. The locating member 300 is then dropped into place on the bottom surface 124 of the face portion 120 with the collar portions 325 positioned in the holes 122. The static shield 430 is then placed on the locating member 300 using the cooperation between the multiple of holes 438 of the static shield and the pins 328 of the locating member to properly locate the static shield with respect to the locating member. This is followed by the button member 410 which is also properly located by the cooperation between the holes 428 therein and the pins 328 of the locating member 300. Finally, the switch contact member 450 is positioned on the button member 410 and also properly located by the cooperation between the holes 438 therein and the pins 328 of the locating member 300. To facilitate this assembly, the height of the pins 328 is greater than the combined thickness of the assembled members of the keypad 400. Consequently, the top surface 214 of the pedestal 210 has the multiple of holes 218 therein to accommodate the ends of the pins 328.

As stated above, when the base member 200 is joined to the housing 100, the top surface 214 of the pedestal 210 is spaced a particular distance from the bottom surface 124 of the face portion 120. The particular distance is essentially the same as the combined thickness of the flange portion 320 of the locating member 300, the static shield 430, the flange portion 420 of the button member 410, and the switch contact member 450. Thus, these members are firmly held together between the face portion 120 and the pedestal 210 when the housing 100 and base member 200 are joined.

It is to be understood that while in the embodiment shown, the locating elements, such as the pins 328, are part of a discrete member associated with the housing 100, they could be integral elements associated with the housing. Furthermore, the locating elements could instead be associated with the pedestal 210 either as integral or discrete elements, such as upwardly extending protrusions on the pedestal or on a member positioned on the pedestal. These and other variations are fully embraced by the claims that follow.

What is claimed is:

1. Method of assembling a keypad in a hollow housing of a telephone, the housing including a face portion having a top surface, a bottom surface, and an array of holes extending through the face portion, the method comprising the steps of:

inverting the hollow housing so that the bottom surface of the face portion is facing generally upward;

positioning a button member comprising a planar flange portion surrounding an array of button portions protruding from a top surface of the flange portion so that the top surface of the flange portion overlies the bottom surface of the face portion and the button portions extend through the holes in the face portion;

positioning a switch contact member having an array of switch contact elements on a top surface thereof that correspond to the array of button portions of the button member so that the top surface of the switch contact member overlies a bottom surface of th flange portion of the button member and the switch contact elements are in registration with the button portions of the button member;

positioning a pedestal having a top surface that generally conforms to the bottom surface of the face portion so that the top surface of the pedestal overlies the switch contact member; and securing a base member of the telephone to the housing, the base member when secured to the housing providing an enclosure for the telephone, holding the top surface of the pedestal in close proximity with the bottom surface of the face portion, sandwiching the switch contact member and the button member between the top surface of the pedestal and the bottom surface of the face portion, and maintaining the button member and the switch contact member in an assembled condition as a unit solely by the securing of the base member to the housing.

2. The method as in claim 1 wherein the pedestal is integral to the base member and wherein positioning the base member on the housing prior to securing the base member to the housing positions the pedestal so that the top surface of the pedestal overlies the switch contact member.

* * * * *